Figure 2:
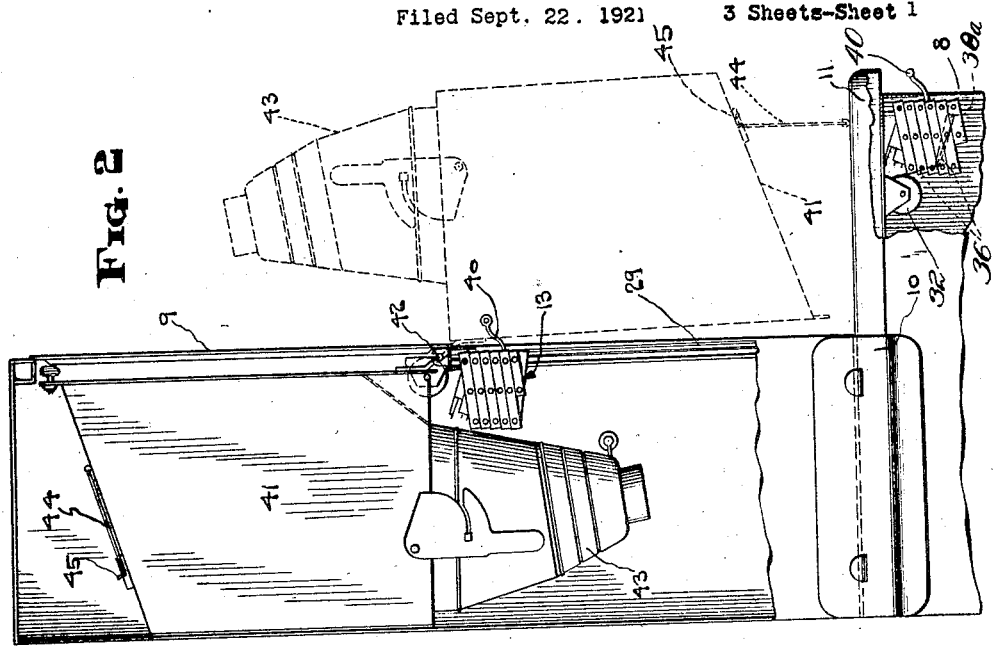

Oct. 28, 1924.

R. HOFFMAN

KITCHEN CABINET

Filed Sept. 22, 1921   3 Sheets-Sheet 1

1,513,111

Inventor:
Rudolph Hoffman
By Miller Chindahl Baker
Atty

Oct. 28, 1924.  
R. HOFFMAN  
KITCHEN CABINET  
Filed Sept. 22, 1921  
1,513,111  
3 Sheets-Sheet 2

Inventor:
Rudolph Hoffman
By Miller Chridahl Baker
Attys

Oct. 28, 1924.  
R. HOFFMAN  
KITCHEN CABINET  
Filed Sept. 22, 1921  
1,513,111  
3 Sheets-Sheet 3
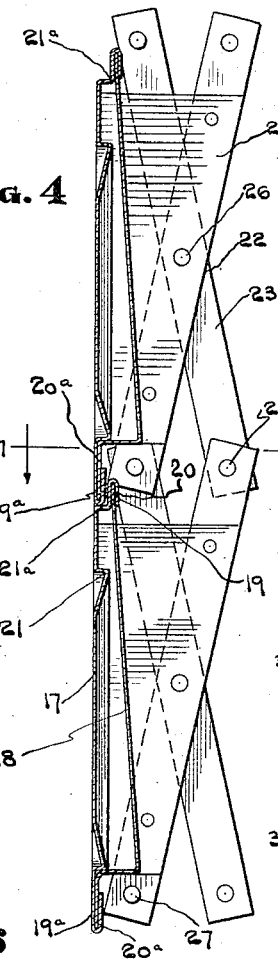
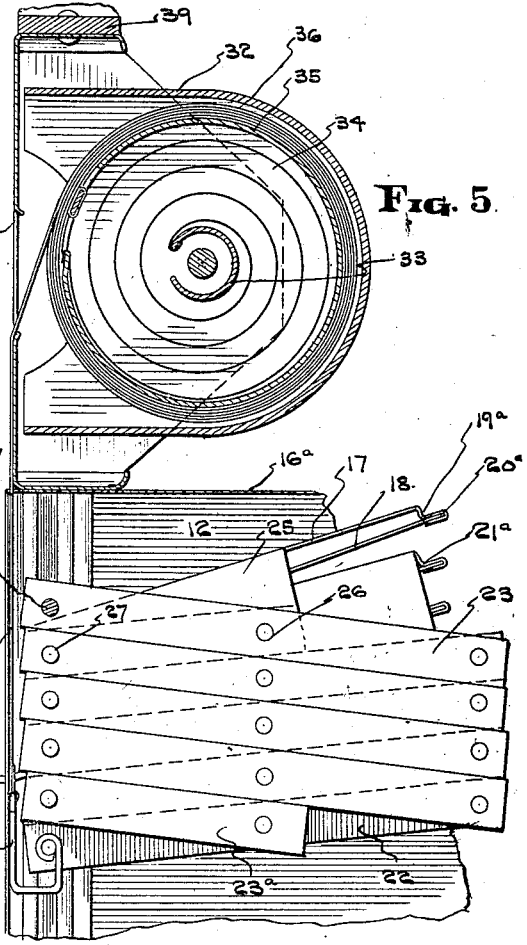
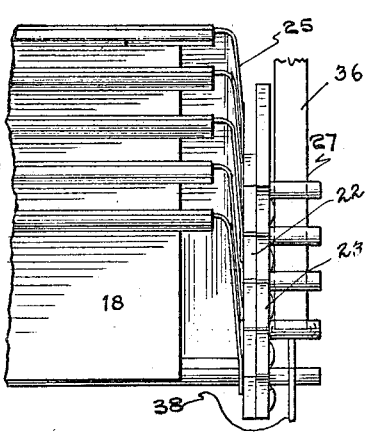
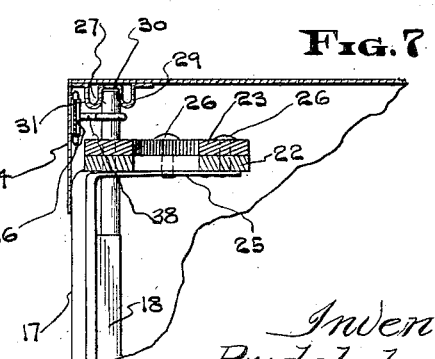
Inventor
Rudolph Hoffman
By Miller Chindahl Parker
Attys Patented Oct. 28, 1924.

1,513,111

UNITED STATES PATENT OFFICE.

RUDOLPH HOFFMAN, OF KANKAKEE, ILLINOIS, ASSIGNOR TO SEARS, ROEBUCK AND CO., OF CHICAGO, ILLINOIS, A CORPORATION OF NEW YORK.

KITCHEN CABINET.

Application filed September 22, 1921. Serial No. 502,338.

*To all whom it may concern:*

Be it known that I, RUDOLPH HOFFMAN, a citizen of the United States, residing at Kankakee, in the county of Kankakee and State of Illinois, have invented certain new and useful Improvements in Kitchen Cabinets, of which the following is a specification.

The invention relates to kitchen cabinets and especially to a cabinet constructed almost entirely of sheet metal; and it has for its primary object the provision of a cabinet having a shutter also made of metal for closing one or more of the compartments, and which is especially adapted to this purpose, it being capable of rapid and easy manipulation with substantially no noise, occupying a minimum amount of space whether in its open or closed position, and capable of effectively closing the compartments while presenting a neat and ornamental appearance.

More specifically stated, one object of the invention is to provide in a kitchen cabinet a shutter of the type comprising a plurality of leaves connected together so as to be operable from an extended relation across the openings to a compact stack at the one edge of the opening.

Another object of the invention is to provide a cabinet with a collapsing door or shutter for the upper forward portion thereof, which is capable of assuming a position at the upper edge of the opening to be closed such that when open it presents no obstruction to the swinging movements of a flour bin mounted within the cabinet and swingable on a horizontal axis to a forward or filling position, thus permitting the shutter to be made of a length extending across the entire front of the cabinet.

A further object of the invention is to provide a cabinet in which, when the shutter is moved to open position, no cavities are presented in the top board, in which flour and other matter may collect.

A further object of the invention is to provide a shutter of the character referred to which is of a very practical construction, substantially noiseless in operation, durable, and capable of operation with extreme ease.

In the accompanying drawings, I have shown but one embodiment of the invention, it being understood that the appended claims are not to be limited in their interpretation to the precise construction and arrangement illustrated and described except as may be necessitated by the state of the prior art.

Figure 1:
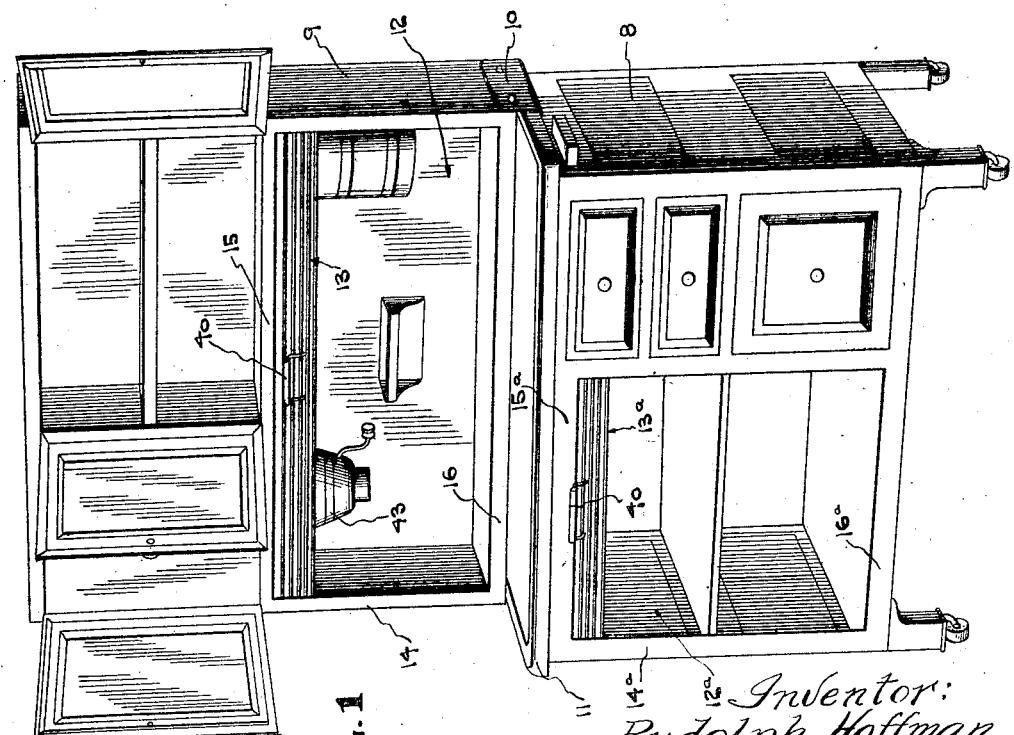
Figure 8:
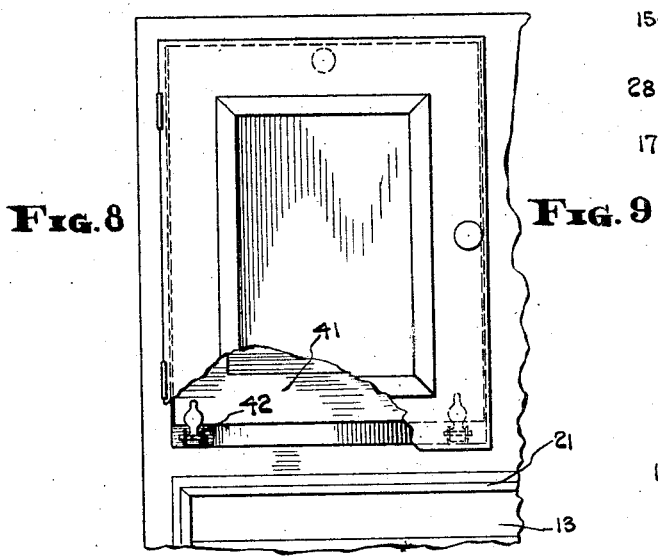
Figure 9:
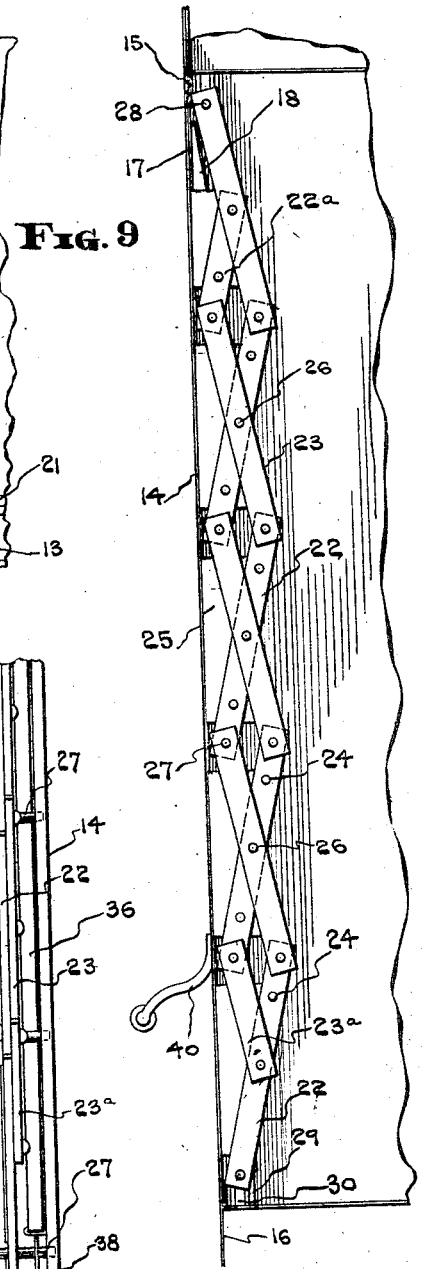
Figure 3:
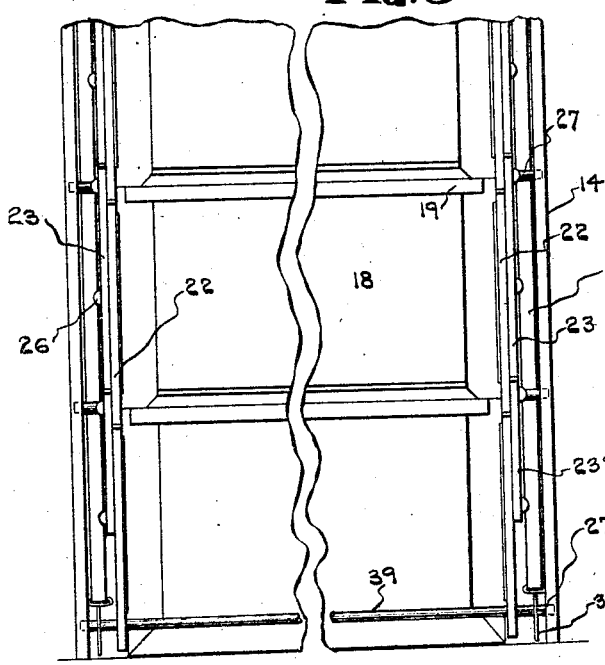

Figure 1 of the drawings is a perspective view of a kitchen cabinet to which the invention is applied showing the improved shutter in open position. Fig. 2 is a fragmentary vertical sectional view through the cabinet showing the shutter collapsed and in edge elevation. Fig. 3 is a fragmentary elevational view of the rear side of the extended shutter and its guideways. Fig. 4 is a vertical sectional view on an enlarged scale through a pair of leaves of the shutter and showing the hinge connections. Fig. 5 is a fragmentary vertical sectional view showing the shutter in its collapsed relation, and its counterbalancing spring means. Fig. 6 is a fragmentary rear side elevational view of the shutter in its collapsed position. Fig. 7 is a horizontal fragmentary section taken substantially in the plane of line 7—7 of Fig. 4. Fig. 8 is a front elevational view of the upper portion of the cabinet. Fig. 9 is a fragmentary vertical sectional view through the upper section of the cabinet, with the shutter extended.

Referring to Fig. 1 of the drawings, 8 designates the base section of a kitchen cabinet, and 9 the upper or top section supported on the base section, in spaced relation, by means of brackets 10. The usual work table 11 is mounted to slide between the two sections 8 and 9, and the two sections provide compartments for kitchen utensils of various kinds. Thus the top section of the cabinet has a compartment 12, immediately above the work table 11, which is closed by a shutter designated generally by the numeral 13; and the bottom section has a compartment 12$^a$ closed by a shutter 13$^a$. Preferably the cabinet proper is constructed almost wholly of sheet metal, and the shutters also are made of metal as will hereinafter more fully appear.

The compartment 12 has a forward frame comprising side members 14, a top member 15 and a bottom member 16, said frame defining the opening to be closed. Similarly the compartment 12ª has a forward frame comprising side members 14ª, top member 15ª and bottom member 16ª.

Each of the shutters 13 and 13ª comprise a plurality of leaves which preferably comprise a forward wall or face plate 17 formed of sheet metal and a rear wall 18 of similar material spaced from the forward wall. The two walls of the leaf are secured together in any suitable way as by means of interengaging flanges 19 and 20, and 19ª and 20ª (Fig. 4). The flanges 19 and 19ª are bent around the flanges 20 and 20ª, and the parts are secured together in any suitable way as by spot welding. The rear wall 19 thus provided, constitutes a reinforcing member for the leaf rendering the same rigid and incapable of warping or flexing. To assist further in reinforcing the leaf, the face plate is corrugated as at 21 forming a panel in the central portion of the leaf. This panel contributes to the ornamental appearance of the leaf. Preferably the edges of the leaves are shaped so as to coact to provide a flat face for the shutter. Thus the upper edge of each leaf is offset inwardly as at 21ª so as to underlie the lower edge of the upper adjacent leaf.

The leaves are hingedly connected together by means of a lazy tong linkage consisting of a pair of links 22 and 23 for each of the intermediate leaves, the opposite end leaves having relatively shorter links 22ª and 23ª, (Fig. 2). The links 22 and 22ª are made rigid with respect to the leaves and preferably are in the form of steel bars made separately from the leaf structure and secured thereto as by means of rivets 24. For this purpose, the ends of the front wall 17 of each leaf are provided with rearwardly extending flanges 25 upon the outer sides of which the links 22 and 22ª are secured; and these rigid links are arranged at an acute angle with respect to the leaves so that when the leaves are in their upright or extended position, the links of the lazy tong are relatively inclined in the usual manner. The links are pivotally connected together to form the lazy tong hinge structure by means of pivot studs 26; and at the lower ends of the links 22 and 22ª and hence at the lower edges of the leaves, said studs are extended to provide guide studs 27 operable in straight guideways 29 mounted in the opposite side walls of the compartment 12.

The guideways 29 may be of any suitable construction. Herein, (Fig. 7), they are made of sheet metal in the form of a strip bent upon itself to form a central groove 30 and edge flanges 31 by means of which they are secured as by means of spot welding to the side walls of the compartment 12. These guideways are located immediately behind the side frame members, and the latter are made of substantial width so as to overlap the ends of the leaves of the shutter, which by reason of the location of the guideways and the arrangement of the guide studs 27, has its forward face disposed approximately flush with the forward face of the cabinet formed by the frame members.

The upper ends of the uppermost links 23 are pivotally supported by a rod 28 which is suitably mounted in the cabinet at the upper edge of the opening to be closed. Thus the leaves of the shutter are operable from an extended relation across the opening into a collapsed relation one upon the other in the form of a compact stack at the upper edge of the opening. When in such collapsed relation, the leaves, it will be observed, extend rearwardly (Fig. 5) into the compartments 12 or 12ª, the forward edges of the leaves being located in a plane rearwardly of the forward face of the cabinet formed by the frame members 14, 15 and 16, or 14ª, 15ª and 16ª; and when the leaves are operated into their extended relation across the opening, their forward faces lie approximately flush with the forward face of the cabinet, (Fig. 7), thus forming an effective seal for the openings and at the same time presenting a neat appearance to the cabinet.

For the purpose of facilitating the operation of each shutter and for maintaining it in its open position I employ a pair of counterbalancing springs shown particularly in Fig. 5. These springs are of ordinary construction, comprising a casing 32 having pivotally mounted therein a central stationary sleeve 33, to which one end of a spring 34 is secured. The opposite end of said spring is secured to a drum 35 having wound thereon a tape 36 one end of which is secured to the drum. Its opposite end passes through an opening 37 in the casing and then downwardly for connection with the lowermost leaf of the shutter. Such connection is preferably effected by means of angular wire arms 38 mounted upon the cross rod 39 carried by the leaf, the ends of said rod being herein extended to form the guide studs 27 for the lowermost leaf.

The counterbalancing springs are mounted in the cabinet above the opening to be closed, and may be secured in position by any suitable means such as angle irons 39. Preferably the springs are made of such strength as to support the shutter in any position across the opening. Thus, the use of separate means for supporting the shutter in its collapsed position at the upper end of the opening is unnecessary.

As shown in Fig. 2, the counterbalancing springs are located slightly rearward of the shutter for the lower compartment and the tapes 36 are connected to the one of the lower leaves of the shutter by hooks 38ª engaging in the flange at the lower forward edge of the rear leaf plate 18. By this arrangement the shutter when in its open or collapsed relation occupies a position adjacent the top wall of the base section 8 of the cabinet.

By thus completely counterbalancing the shutter, the operation is rendered extremely easy. The linkage operates with substantially no noise, and exceedingly smoothly so that the shutter is extremely well adapted for the particular use to which it is applied. I am aware that shutters have formerly been used in kitchen cabinets, but in all instances, they must be slid in curved guideways into especially provided spaces or cavities being made flexible for this purpose. These shutters have proven extremely objectionable because of their tendency to stick in their slideways, necessitating a tugging and pulling by the operator to effect a jerky and otherwise unsatisfactory closing or opening; and obviously in a sheet metal cabinet the use of such shutters is rendered even more impractical on account of the increased friction of the metal, more noise in operation, and the injury to the finishing enamel due to the rubbing of the parts together. It will be observed that my improved shutter, operating in straight guideways, with a minimum of friction and noise, effectively overcomes the difficulties thus encountered, whether used in a wooden or a metallic cabinet, because it is of a non-flexible, collapsible-leaf type.

For the convenience of the user in operating the shutter I preferably provide a handle 40 which may be secured to any one of the leaves and which is so shaped as not to interfere with the operation thereof. Herein, in the case of the upper shutter, the said handle is secured to the second leaf from the bottom at the lower edge thereof as by spot welding, and in the case of the lower shutter is secured to one of the upper leaves for convenience, this being made possible by the peculiar manner in which the leaves are connected.

Within the upper portion of the cabinet I provide certain utensils in the nature of fixtures such, for example, as a sugar container 40ª and a flour bin 41 (Fig. 1). Said bin is mounted upon stationary but detachable pivots 42 within a compartment opening at its lower end into the compartment 12 closed by the shutter 13 and the lower end of the bin carries a detachable sifter 43 depending into the compartment 12. The arrangement is such that the bin may be readily swung from its normal position in the cabinet into an inverted position forwardly of the cabinet for filling purposes. Preferably I provide means for supporting the bin in its inverted position, which may consist of a U-shaped leg 44 which normally lies on top of the bin (Fig. 2), and automatically falls into operative position, engaging with the table top 11. The ends of the leg are bent to provide stop lugs 45 adapted to engage with the under side of the bin, thus enabling the leg to support the bin, preventing it from engaging the shutter.

It will be seen, by reference to Fig. 2, that even though the shutter 13 is in its collapsed relation at the upper edge of the opening, it does not interfere with the free swinging movements of the flour bin 41 upon its pivots 42. This arrangement is particularly advantageous as compared with prior devices wherein the shutters have been slidable as a whole from a vertical position into either a straight horizontal position or a helically coiled position above the compartment closed by the shutter. Furthermore, the collapsing of the shutter at the upper edge of the opening is important in that by this arrangement the cavities which are necessarily provided for the reception of non-collapsible sliding shutters, and in which flour, dust, and other matter may accumulate, are eliminated.

The use of a collapsing shutter for closing the compartment in the lower section of the cabinet constitutes a distinct advantage over the hinged wide swinging door formerly employed. By reason of the substantial size of the opening to be closed, such swinging door was necessarily also made of substantial size and weight so that it ultimately sagged on its hinges rendering it unsightly and inefficient.

This application is a continuation in part of my copending application Ser. No. 378,376 filed May 3, 1920.

I claim as my invention:

1. A kitchen cabinet having upper and lower intercommunicating compartments, the lower compartment having an opening to be closed, a flour bin in the upper compartment having at its lower end a downwardly tapering portion depending into the lower compartment, said bin being mounted upon a fixed pivot so as to swing forwardly into an inverted position in front of the lower compartment, a pair of straight upright guideways at opposite side edges of the opening, and a shutter comprising a plurality of leaves operatively connected together so as to be movable from an extended relation across the opening into a compact stack one upon the other at the upper edge of the opening, certain of the leaves having guide studs operable in said guideways and located at the lower or forward edges of the leaves whereby the latter when in collapsed relation extend rearwardly from the opening wholly within the compartment, and said leaves being relatively narrow so that in their last mentioned relation they occupy a position forwardly of the tapering lower end portion of the bin.

2. In a kitchen cabinet, the combination of an upper section having upper and lower compartments, the lower compartment having an opening to be closed, a flour bin mounted in the upper compartment and having a portion depending into the lower compartment, said flour bin being mounted upon a fixed pivot at the forward edge of its compartment, and a shutter for closing the said opening comprising a plurality of leaves operatively connected together so as to be operable from an extended relation across the opening into a compact stack one upon the other within the compartment forwardly of the depending portion of the flour bin, said shutter being adapted when in its collapsed relation to permit the unrestricted movement of the bin upon its pivot from a normal upright position in the cabinet to an inverted position forwardly of the cabinet, and means for supporting the flour bin in its forward inverted position so as to prevent it from swinging into engagement with the shutter.

In testimony whereof, I have hereunto set my hand.

RUDOLPH HOFFMAN.